United States Patent Office 3,472,027
Patented Oct. 14, 1969

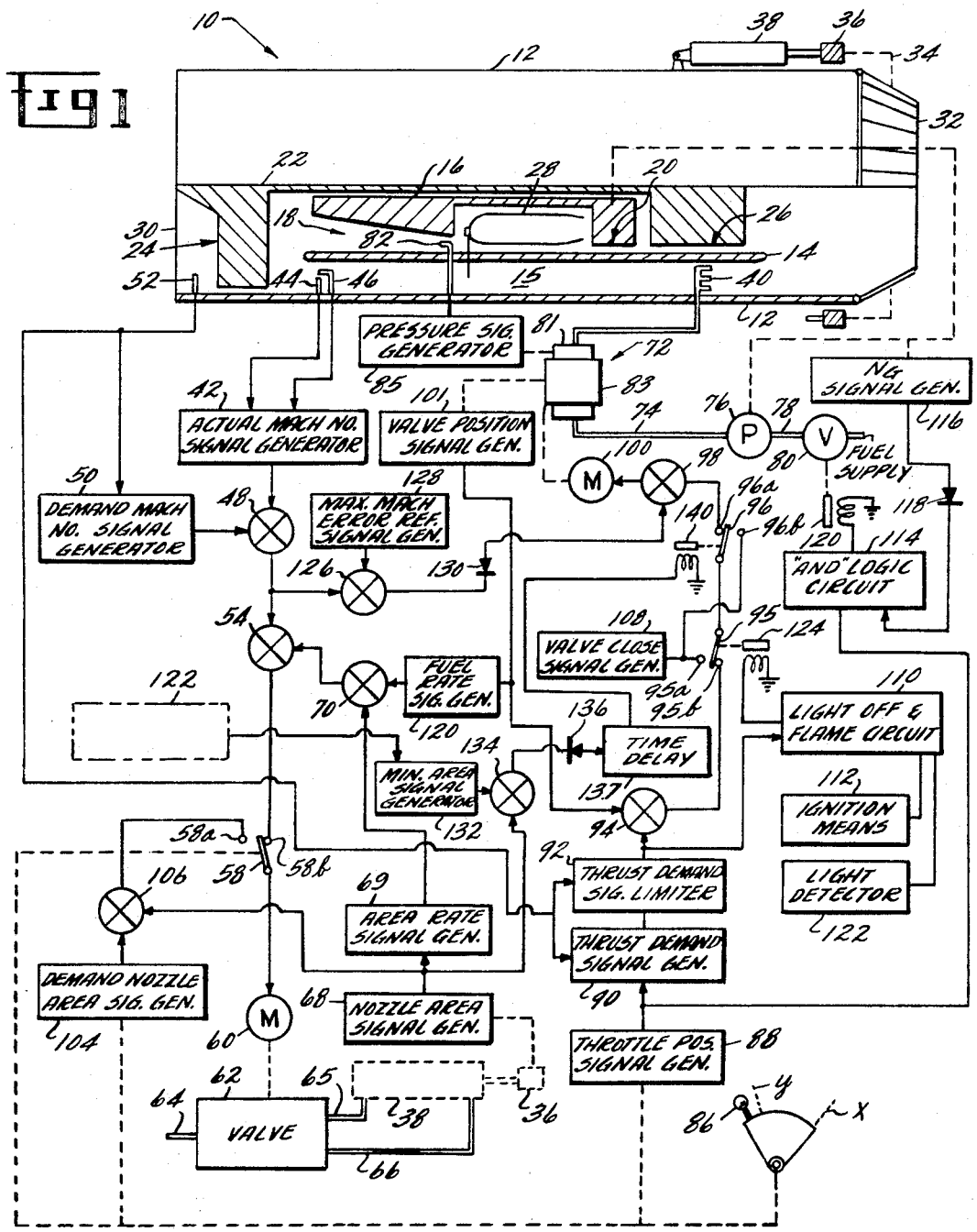

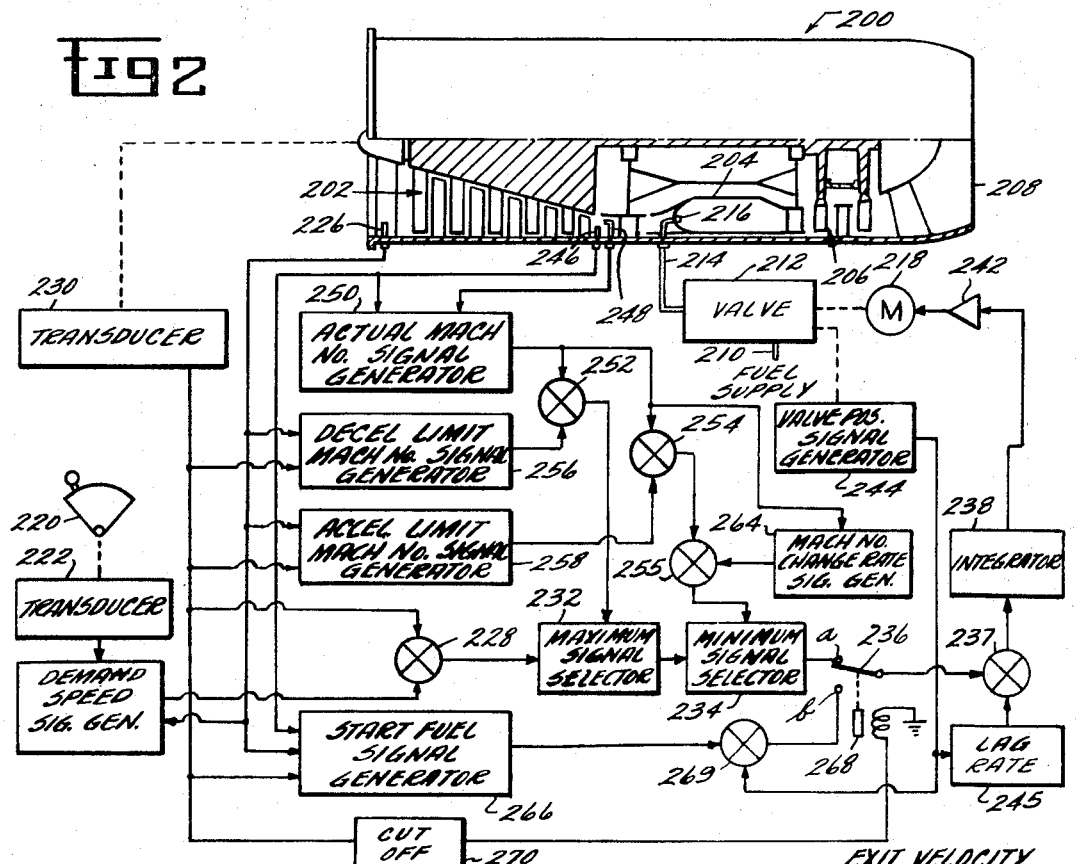
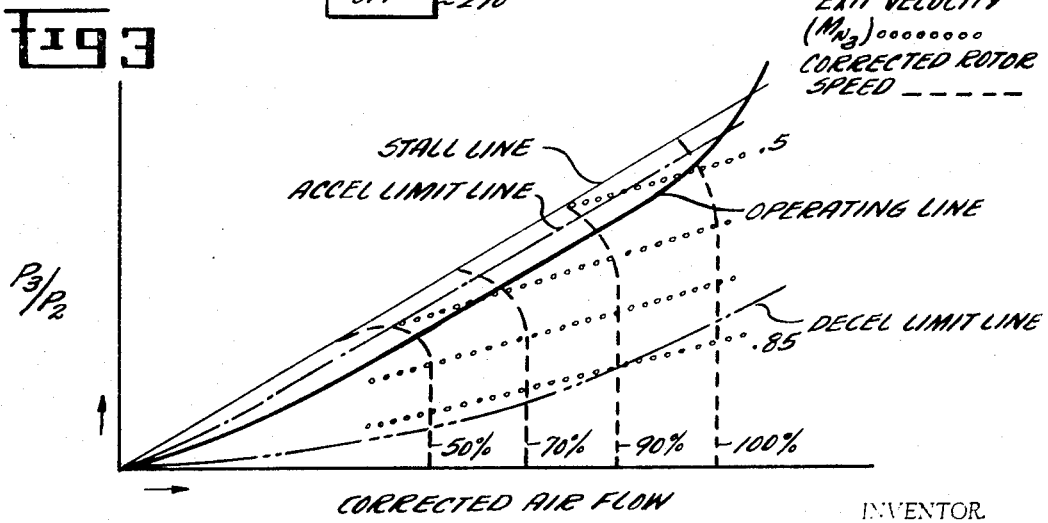

3,472,027
CONTROL SYSTEMS FOR AXIAL FLOW COMPRESSORS PARTICULARLY ADAPTED FOR USE IN GAS TURBINE ENGINES
Barton H. Snow and Ronald F. Borel, Cincinnati, Ohio, assignors to General Electric Company, a corporation of New York
Filed Dec. 22, 1966, Ser. No. 603,794
Int. Cl. F02k 1/16, 1/18, 3/02
U.S. Cl. 60—236                    1 Claim

ABSTRACT OF THE DISCLOSURE

The disclosure illustrates control systems for gas turbine engines predicated on the use of compressor discharge Mach number as a control parameter. In one embodiment an augmented turbofan engine control system shows a control loop in which the Mach number of the fan stream duct is regulated against a reference Mach number value by controlling the variable area discharge nozzle of the engine. The rate of augmented fuel flow to the fan duct is regulated through a closed loop having a pilot input as a function of engine inlet temperature and core engine discharge pressure. The Mach number loop is interconnected with the augmentation fuel flow loop to reduce fuel flow if Mach number limits are exceeded. In another embodiment the Mach number at the discharge of a compressor in a turbojet engine is employed in a closed loop system to regulate fuel flow during transient operation.

---

The present invention relates to improvements in control systems for axial flow compressors employed in gas turbine engines or the like.

Axial flow compressors are employed in gas turbine engines to increase the energy level of a hot gas stream generated by such engines or to provide an air stream which may be discharged through a nozzle to provide a propulsive force. Such compressors generally include a rotor having at least one circumferential row of airfoil shaped blades, with each row of blades employed in combination with a circumferential row of stator blades also of airfoil cross section. In normal operation, air flows over these blades and is forced axially downstream of the compressor through an annular flow path of diminishing dimension to provide a high energy pressurized air stream. A stall condition occurs when air flow separates from the airfoil shaped blades. This results in a loss of pressurization and a resultant loss in energy output from the compressor and the engine. One of the prime concerns, therefore, in the operation of gas turbine engines is the prevention of compressor stall.

One basic type of gas turbine engine employs an axial flow compressor which discharges pressurized air to a combustor where fuel is burned to generate a high energy hot gas stream. This gas stream then passes through and drives a turbine which in turn rotates the rotor of the compressor. The remaining energy of the hot gas stream may then be converted to a propulsive force by discharging the gas stream through an exit nozzle. Alternatively, the hot gas stream may drive a power turbine to provide a useful output.

A second basic type of engine employs the same combination of compressor, combustor and turbine as a "core engine." The hot gas stream, however, drives a second turbine which in turn powers a so-called fan or low pressure compressor which pressurizes an air stream which is also discharged through an exit nozzle to provide a propulsive force. This latter type of engine is referred to as a turbofan engine.

In both the turbofan and turbojet engines, fuel may be burned in the gas or air streams prior to their being discharged from the exit nozzle to provide additional propulsive force from what is referred to as afterburner or augmented operation.

For every compressor there is a relationship between the pressure rise thereacross and the corrected air flow therethrough which can be plotted to give a line above which a compressor stall will predictably occur for all rates of rotation of the ompressor rotor. Normal operation of gas turbine engines is generally controlled by a pilot actuated lever which sets the rate of fuel flow to the combustor and/or to the afterburner of the engine. This determines the combustion rate and the energy level of the hot gas stream and in turn gives a demanded thrust or energy output from the engine. If fuel flow is increased at too rapid a rate a stall will occur in the compressor. Thus, while a pilot operated lever demands an increase in fuel flow it is necessary to limit the rate at which fuel flow is increased in order to prevent compressor stall.

Conventional engine controls have generated signals for limiting the rate of fuel flow increase which control signals are a function of compressor rotor speed (r.p.m.) and the total pressure of the air discharged from the compressor. One disadvantage of such prior systems is that they do not provide sufficient accuracy to permit safe and reliable operation with pressurized air flow relationships closely approaching a stall condition where maximum acceleration rates can be obtained. Maximum acceleration rates and resultant minimum times in increasing the thrust output of an engine are of a special importance in the operation of aircraft, particularly in take off or in the case of a wave off from a landing approach, and also in vertical take off and landing aircraft.

Another shortcoming of such conventional control systems is that they are not adequate for certain types of compressors where the approach of a stall condition can be indicated by both an increase and a decrease in the compressor discharge pressure for a given speed.

Accordingly, one object of the invention is to overcome the shortcoming of the present control systems and provide for safe and more reliable operation of gas turbine engines by permitting the compressors thereof to operate in closer proximity to a stall condition.

Another object of the invention is to provide a control system which is suitable for use with compressors having widely different relationships between the pressure rise thereacross and air flow therethrough over their operating speeds.

A further problem in the operation of gas turbine engines, where fuel is burnt immediately downstream of the compressor discharge, is that when fuel flow is decreased to reduce the energy output of the engine, the relationship between pressure rise across the compressor and the rate of air flow therethrough results in a flameout in the combustor (or afterburner) which gives a consequent total loss of energy from the engine. It is therefore desirable to limit the rate at which fuel flow is decreased or the rate at which the discharge pressure is decreased.

Simply using compressor discharge pressure and engine speed or compressor speed as the parameters for generating a deceleration limit control signal for the rate at which fuel flow may be decreased fails to provide sufficient accuracy for extreme, minimum deceleration times in reducing the energy output of the engine, as becomes of great importance in vertical take off or landing aircraft.

A further object of the invention is therefore to overcome the deficiencies of prior systems in minimizing the deceleration time required for reducing the energy output of an engine.

The above ends are attained by the provision of a control system for the compressor of a gas turbine engine or the like, wherein means are provided for sensing the Mach No. of gas discharged from the compressor. The system further includes means connected to the sensing means for deriving a control signal as a function of the Mach No. of gas discharged from the compressor. Means responsive to this control signal are provided for preventing the relationship between the compressor rise and the gas flow therethrough from exceeding critical limits as could cause compressor stall or loss of combustion in a combustor means downstream of the compressor.

As exemplified in a turbofan type of engine, the control system is employed in combination with means for metering fuel to spray bars which introduce fuel to be burned in a fan air stream prior to discharge through an exit nozzle. Flow of fuel to the afterburner spray bars is controlled as a function of pilot demand. The area of the exit nozzle is controlled to maintain the Mach No. of the air stream discharged from the low compressor fan at a predetermined value giving desired energy output without incurring a stall condition. The exit area is also controlled as a function of its own rate of change and as a function of the rate of change in fuel flow for more stable and accurate operation. Further means are provided for reducing fuel flow in the event the actual Mach No. exceeds the preselected or demand Mach No. by a given magnitude further assuring safe operation.

Embodied in a turbojet engine, the features of the invention are found in employing control signals, derived from the Mach No. of the air discharged from the compressor, to limit the rate fuel flow may be increased or decreased to the combustor, and thus respectively prevent stall during an acceleration and combustor blowout during a deceleration. Additionally, the rate of change in Mach No. can further reduce the flow of fuel to the combustor during acceleration.

The above and other related objects and features of the invention will be apparent from a reading of the following description of the disclosure found in the accompanying drawings and the novelty thereof pointed out in the appended claims. In the drawings:

FIGURE 1 is a diagrammatic view of a turbofan engine and a control circuit therefor in accordance with the present invention;

FIGURE 2 is a diagrammatic view of a turbojet engine and a control system therefor in accordance with an alternate embodiment of the invention; and FIGURE 3 is a plot of certain compressor relationship commonly known as a compressor map.

FIGURE 1 schematically shows a turbofan gas turbine engine 10 with a control system, embodying the present invention, connected thereto. The engine 10 comprises an outer casing 12 and a concentric inner casing 14 forming a fan duct 15. A so-called core engine is disposed within the casing 14 and comprises a rotor having at one end a portion 16 which forms in part a compressor 18 and at the other end a portion which forms in part a turbine 20. The engine further comprises a second rotor having at one end a portion forming in part a low pressure compressor or fan 24 and at the other end a portion which forms in part a fan turbine 26.

In highly simplified terms, operation of this engine involves compression of an annular air stream by the compressor 18. Ignition of fuel in a combustor 28 to generate a high energy gas stream which first passes through the turbine 20 to drive the core engine rotor 16 and then passes through the fan turbine 26 to drive the fan rotor 22. Air entering the engine inlet indicated at 30 is first compressed by the fan 24. A portion of this air enters the core engine to generate the hot gas stream, as described. Another portion of the compressed inlet air passes through the fan duct 15. The hot gas stream from the core engine and the air stream from the fan duct 15 are then discharged through a nozzle 32 to provide a propulsive force as in an aircraft installation.

To provide a desired propulsive force consistent with other operating parameters, the nozzle 32 is of the variable area type and comprises a plurality of leaves or fingers which are mechanically connected as indicated by the broken line 34 to an actuation ring 36. The actuation ring 36 is longitudinally shifted, relative to the casing 12, by a plurality of system type actuators 38 (only one of which is shown) to increase or decrease the exit area of the nozzle 32. The described structure to this point is well known to those in the art.

In order to obtain a greater propulsive force, it is also known to burn further fuel either in the hot gas stream or in the air stream from the fan duct or after a mixing of the two streams. This is generally referred to as augmented or afterburner operation. In the present instance, combustor means in the form of afterburner fuel nozzles 40 are provided in the fan duct 15 for augmentation of the fan air stream. The present invention is particularly applicable to controlling the rate of afterburner fuel combustion and the area of the discharge nozzle 32 in a manner which will give highly efficient operation, while minimizing, if not eliminating the possibility of a stalled condition occurring in the airfoil shape blades of the fan 24.

The control circuit comprises a signal generator 42 for producing an output signal indicative of the Mach No. of the gas stream as it is discharged from the fan 24 into the fan duct 15. The signal generator 42 is connected to pressure probes 44, 46 which respectively measure static ($P_s$) and total ($P_t$) pressure of the air stream at this point. These pressures are converted into an electrical signal which accurately represents Mach No. The output of signal generator 42 is a direct function of ($P_t$ minus $P_s$)/$P_s$. Below 600° F., this relationship is sufficiently accurate as a direct indication of Mach No. It is contemplated that above this temperature, or for even greater accuracy, this pressure relationship could be modified by the known effects of specific heat. The signal generator 42 may take the form of the means shown in co-pending U.S. application, Ser. No. 461,796 filed June 7, 1965, appropriately modified to provide a direct current signal output.

At this point it will be noted that several different signals are employed in the present circuit. As will be obvious to those skilled in the art, these signals may be in the form of direct current voltages having the proper polarity and strength for the stated functions. It will also be obvious that other types of signals could perform the stated functions.

The actual Mach. No. signal is compared at a summation point 48 with a desired or demand Mach No. signal provided by a signal generator 50. The signal generator 50 provides a signal reflecting a desired Mach No. at the fan exit, as a function of the temperature of the air entering the engine, which in turn reflects the corected speed of rotation of the fan as is later explained. To this end, there is a connection from a temperature sensor 52 disposed at the fan inlet to the signal generator 50. Signal generator 50 may be of the well known diode function generator type which may provide an output voltage having predetermined relationship, not necessarily linear, to the fan inlet temperature and an assumed constant fan speed.

The summation point 48 and other summation points here and after referred to may be of the operational amplifier type and provide an output which is a mathematical summation of the input thereto taking into account both the magnitude and polarity of these inputs.

From the summation point 48 a Mach No. error signal passes to a second summation point 54 (later described) and then through a selector switch 58, as a control signal, to a troque motor 60 which positions a four-way valve 62. The valve 62 is connected to a source of pressurized hydraulic fluid by a conduit 64 and has outputs 65, 66 respectively leading to the head and rod ends of the actuators 38 (one such actuator being repetitiously shown in phantom). The valve 62 properly directs fluid to the actuator 38 to displace the actuation ring 36 in a direction either increasing or decreasing the exit area of the nozzle 32 dependent upon the magnitude and polarity of the control signal as the nozzle is either opened or closed, the actual Mach No. error is varied to null out the error signal and thus establish a desired Mach No. at the fan exit.

In order to provide stability for this control valve loop, a rate feedback signal is provided by a mechanical connection which is made from the unison ring 36 to a nozzle area signal generator 68 having an output whose magnitude indicates the actual area of the nozzle 32. This signal is fed to a differentiating circuit which functions in a known manner as a rate sigal geerator 69. The output of the rate signal generator passes through a summation point 70 (later described) to the summation point 54 as a negative feedback. When the nozzle area is being displaced at a rapid rate the feedback signal to summation point 54 is large and the resultant control signal to the motor 60 is reduced, conversely when there is a slow rate of movement there is a small rate signal which has little effect on the control signal.

Up to this point, it has been assumed that the afterburner is in operation. This assumption will also apply to the immediately following description of flow of fuel to the afterburner fuel nozzle 40.

Fuel flow to the afterburner nozzle 40 is controlled by a metering valve 72. This metering valve is connected by a conduit 74 to a pressurizing pump 76 which is preferably of the centrifugal type and driven by a mechanical connection to the core engine rotor 16. The pump 76, in turn, is connected to a suitable source of fuel by a conduit 78 having a valve 80 interposed therein. The valve 72 may be of conventional construction and comprises two elements 81, 83 and meters fuel flow as a function of both a pilot demand signal and the pressure of the air discharged from the core engine compressor 18. The latter function is provided by a connection from a pressure sensor 82 to a signal generator 85 having a mechanical output to the valve element 81.

The valve 72 and specifically element 83 is controlled as a function of the position of the pilot operated throttle lever 86 through the following control circuit. The lever 86 is displaced by the pilot from a starting position indicated by line $x$ to a position indicated by line $y$ in which maximum flow of fuel to the core engine combustor 28 is provided by known means which have no direct interface with the present control and therefore are not shown. Movement of the throttle lever 86 beyond position $y$ initates and controls flow of fuel to the afterburner nozzble 40.

The throttle lever 86 is mechanically connected to a throttle position signal generator 88 which produces an output reflecting a desride thrust once the throttle lever is moved past position $y$. This signal is fed to a thrust demand signal generator as which computes a thrust demand signal in terms of a proper fuel to air ratio reflecting the engine inlet temperature. To this end, it will be seen that there is a connection between the temperature sensor 52 and the thrust demand signal generator 90.

The thrust demand signal then passes to limiter circuit 92 which prevents the thrust demand signal from exceeding a given value for a given temperature condition. Here again it will be noted, that there is an input connection from the temperature sensor 52 to the thrust demand signal limiter 92. The limiter 92 and signal generator 90 are per se known to those skilled in the art. The thrust demand signal then passes through a summation point 94 (later described) through switches 95 and 96 to a summation point 98. From the summation point 98, a control signal is applied to a torque motor 100 which is mechanically connected to the valve element 83. The two elements of the control valve 72 function as a multiplier so that the fuel to air ratio input, represented by the demand signal to the motor 100 is modified by the position of the valve element 81 to provide the desired fuel flow for the demanded fuel air ratio.

A mechanical conection is provided from the valve element 83 by a mechanical connection therefrom to a valve position signal generator 101. The output from this signal generator reflects the valve position and actually the fuel to air ratio at the afterburner nozzles 40. This actual fuel to air ratio signal is then fed to the summation point 94 where it is compared with the thrust demand signal to generate a thrust error signal, the thrust error signal being nulled out when the valve element 83 has been displaced to provide the necessary fuel to air mixture for the demanded thrust.

As has been indicated, the above description has been based on the assumption that afterburner operation has already been initiated. The circuit will now be described as it is before afterburner operation is initiated.

When the throttle lever 86 is between the $x$ and $y$ positions the engine operates in its "dry" condition. In this position, there is no output from the throttle position signal generator 88. In the absence of an output signal from the generator 88, the valve 80 is closed (as will be later apparent) shutting off flow of fuel to the afterburner nozzle 40 so that there is no afterburner combustion. Also, for reasons more fully discussed hereinafter, it is preferable, during "dry" operation, that the area of the exit nozzle 32 be controlled as a function of throttle lever setting or at a fixed opening rather than as a function of the Mach No. error signal previously described.

In the present circuit the nozzle area is controlled as a function of throttle lever position by a mechanical connection from the level 86 to a demand nozzle area signal generator 104. This signal generator may be of known construction and provides an output indicative of a desired area. This desired area signal is compared at summation point 106 with the actual nozzle area signal from the generator 68 to provide a nozzle area error signal. It will also be seen that there is a mechanical connection between the lever 86 and the switch 58. When the lever 86 is between position $x$ and $y$ the contact arm of switch 86 is moved thereby to contact point 58*a*. The nozzle area error signal is thus applied to the torque motor 60 displacing the valve 62 to set the area of nozzle 32 in accordance with the position of the throttle lever 86.

When it is desired to initiate afterburner operation the throttle lever 86 is displaced, as illustrated, beyond position $y$ and the following sequence occurs. The contact arm of switch 58 is displaced to engage contact 58*b*, applying the control signal (derived as a function of Mach No. error) to the torque motor 60. It will be appreciated that when afterburner operation is initiated, the nozzle area demand signal generator 104 will have set the area of the nozzle 32 at a point closely approximating the predicted Mach No. for the fan discharge at afterburner ignition. However, it is to be expected that there will be some shift in the area of the nozzle 32 when the control of this area is shifted to the Mach No. control mode.

Simultaneously with displacement of the switch 58 to the Mach No. mode, there will be an output from the throttle position signal generator 88. This demand signal will pass to the summation point 94 and then to the switch 95. However, at this time, the contact arm of switch 95 is connected to contact 95*a* rather than 95*b*, as later explained. With the switch arm engaging contact 95*b*, a valve closing signal from generator 108 is applied to the torque motor 100 to shift the valve element 83 to a minimum flow position, which minimum flow is sufficient for initial ignition of fuel at the afterburner nozzles 40. The thrust demand signal is also applied to a light-off and flame detection circuit 110. This latter circuit is fully described in copending U.S. application, Ser. No. 604,032, filed simultaneously with the present application and assigned to the same assignee. The circuit 110 first actuates ignition means for the minimum flow of fuel to be discharged from the afterburner nozzles 40.

At the same time, the circuit 110 is actuated to actuate the ignition means 112, the throttle position signal from generator 88 is also applied to an AND logic circuit 114. AND logic circuits are well known to those skilled in the art and require two inputs to obtain an output. Thus, it will be seen that the throttle position signal is one input. A second input is provided to indicate that the core engine rotor has obtained a necessary minimum speed. To this end the mechanical connection to the core engine rotor 16 is connected to a rotor speed ($N_g$) signal generator. When this signal reaches a desired level it is passed by a diode 118 to the AND logic circuit 114 producing an output which energizes a solenoid 120, which is mechanically connected to and opens the valve 80. Fuel then flows to the metering valve 72 which is automatically at its minimum flow condition so that a small amount of fuel is automatically fed to the afterburner nozzles 40. It will be appreciated that a definite period of time is required for the fuel to fill the various conduits and manifolds leading to the spray nozzles 140, thus, the ignition means have had a chance to be actuated so that there will be a minimum loss of unignited fuel.

Ignition of the fuel is sensed by a light detector 122 (also described in the last referenced application) which provides an input to the circuit 110 energizing a solenoid 124. Energization of the solenoid 124 causes the arm of switch 94 to shift to contact 95b. The thrust demand signal is then applied to the torque motor 100 causing an increase of fuel flow to the afterburner nozzles 40.

Particularly under large transient conditions, such as those at afterburner light-off, it is desirable that there be interconnections between the fuel control circuit and nozzle area control circuit to further guard against a stall in the fan 24.

Thus, it will be seen that the Mach No. error signal from summation point 48 is fed to a summation point 126. A maximum Mach No. error signal reference signal is also fed to the summation point 126 from a signal generator 128. When the actual error signal exceeds the maximum reference signal the polarity of the output from summation 126 reverses and a signal then passes through a solid state diode 130 to the summation point 98 to reduce the resultant control signal which is applied to the torque motor 100. The effect of this interconnection is that if fuel is being fed to the afterburner nozzle at a rate which is causing a change in the exit pressure of the air from the fan 24 faster than can be compensated for by adjustment of the area of nozzle 32, the rate of fuel flow is then proportionately reduced.

As was previously pointed out, the Mach No. error signal from summation point 48 is modified by a negative feedback from a signal indicating the rate at which the nozzle area is being varied. The resultant control signal from summation point 94 is also modified by a positive feedback reflecting the rate of change in fuel flow. To this end, the valve position signal, from generator 101, is fed to a fuel rate signal generator 120. The fuel rate signal is then combined with the area rate signal at summation point 70. In this fashion, where the rate of fuel flow is increasing which would require a further increase in the exit nozzle area, the fuel rate signal will tend to cancel out the area rate signal so that there will be no tendency of the rate of increase of area to lessen where there is a Mach No. error signal and a fuel rate signal, both indicating a greater exit area is required.

One further interconnection is made between the two circuits by the provision of a minimum nozzle area reference signal generator 132, which is energized by a signal from the light-off detector 122 when ignition occurs. The output of signal 132 is fed to a summation point 134 which has an input connection from the nozzle area signal generator 68. When the nozzle area is at a minimum value, the polarity of the signal from summation point 134 will enable it to pass through a diode 136 as a minimum area signal. This minimum area signal then can pass through a time delay circuit 137 to energize a solenoid 140 and displace the arm of switch 96 into engagement with contact 96b. Contact point 96b is connected to the valve closing signal generator 108 and automatically, a signal is applied to the motor 100 causing the valve element 83 to be shifted to its minimum flow position. Alternatively, the output from the summation point 134 could be fed to the light-off and flame detection circuit 110 to cause it to de-energize the solenoid 124. In either event, fuel flow is automatically reduced to a minimum and if included in the light-off and flame detection circuit, referenced above, the ignition means would no longer be actuated.

The minimum area signal functions to provide minimum afterburner fuel flow primarily when some malfunction of the nozzle area control mechanism has failed. It is to be appreciated that at light-off, the nozzle is usually at a minimum area. Light-off fuel flow should result in an increase of the nozzle area in a relatively short time and a time less than the time constant of the time delay 137 so that the arm of switch 96 remains in contact 96a and fuel flow will continue at the rate set by the thrust demand signal under normal conditions. If the nozzle fails to open beyond its minimum position, after ignition occurs, for a period greater than the time constant of delay 137 then fuel flow is automatically reduced.

When the throttle lever is moved below position $y$, the switch 58 is automatically shifted to contact point 58a, the valve 80 is closed as one of the inputs to the AND logic circuit 114 is removed, and since there is a flameout detected by the light detector 122, the circuit 110 shifts the contact arm of switch 95 to contact point 95a imposing a signal on the torque motor 100 which displaces the valve element 83 to its minimum flow position and the circuit is then in the condition described for initiation of afterburner operation.

From the preceding description, it will be apparent that the exit velocity ($M_{N_3}$) of the air discharged from the fan 24 is a basic control parameter for the ultimate area through which the pressurized air from the fan 24 is discharged. Both dishcarged area and rate of afterburner fuel combustion, which may also be controlled as a function of $M_{N_3}$, affect the discharge pressure from the fan and the stall conditions of the fan.

Bearing in mind that the fan 24 is actually an axial flow compressor, reference is made to FIGURE 3 which illustrates what is commonly referred to as a compressor map. The relationships illustrated on this compressor map are not intended to relate to any specific compressor but simply illustrate the relationship of certain parameters which are generally applicable to the fan 24 as well as other compressors.

Basically this compressor map shows the relationship between the pressure rise across the compressor to the corrected mass air flow through the compressor (pressure rise is hereafter referred to as $P_3/P_2$ wherein $P_3$ is the pressure of the air discharged from the compressor and $P_2$ is the pressure of the air entering the compressor). A stall line indicates the minimum air flow through the compressor for any given $P_3/P_2$ value necessary to prevent stall. Speed lines (representing the corrected rate of rotation of the compressor rotor) illustrate that mass air flow generally increases as speed increases and that higher pressure ratios and consequent higher energy output levels are attained at higher speeds.

In steady state operation, there is a point on any speed line wherein the pressure ratio and mass air flow provide an energy output for maintaining a given thrust output from the engine. A plot of these points results in an operating line for steady state conditions. This operating line, as rotor speed increases, eventually intersects the stall line at what would be the theoretical maximum energy output capability of the compressor. Conventionally, 100% engine speed is selected below the maximum energy capability of the compressor to give a margin of safety from stall and to provide a reverse for maneuverability and additional short time emergency energy output.

In a turbojet engine, the speed of the compressor rotor is controlled by regulating fuel flow to the main combustor in order to obtain the actual compressor speed for a desired thrust output. (In a turbofan engine, fan rotor speed is also a function of the rate of combustion in the core engine.) When it is desired to accelerate the engine, an increase in the energy output of the compressor is required and obtained by increasing the fuel flow to the combustor. This results in a $P_3$ increase which is transiently greater than the increase in corrected air flow. Viewed in such transient terms, the corrected speed lines illustrate the change in air flow resulting from a change in $P_3$ when fuel flow is increased to raise energy output, of the compressor, above the operating line. Similarly, the speed lines illustrate that transiently air flow remains substantially unchanged when $P_3$ is decreased to reduce the energy output of the compressor as by the reduction in fuel flow to the combustor.

Conventional fuel control systems limit the increase of fuel flow to maintain $P_3/P_2$ at an acceleration limit for a given speed. A plot of such limits yields the acceleration limit line shown in FIGURE 3. Similarly, there is a deceleration limit that cannot be exceeded lest the flame in the combustor be blown out. When fuel flow is decreased, $P_3/P_2$ decreases to transiently faster than air flow. With a fixed area for the air passing from the compressor to the combustor the air velocity will increase, as, for example, indicated on the 100% speed line. Fuel flow must therefore not be reduced below the amount required to maintain $P_3/P_2$ above the deceleration limit line.

Attention is next directed to lines of constant Mach No. ($M_{N_3}$) of air discharged from the compressor. These lines have a slope which is positive in the same direction as the stall line and at an angle, generally, not sharply divergent from the stall line. In fact, some compressors may have a single Mach No. line which is essentially parallel to the stall line and coincident with the acceleration limit line. These relationships to the stall line are contrasted to those of the speed lines. The speed lines, often those of lower value, have a negative curvature in approaching the stall line. This curvature, and particularly as it becomes more pronounced, not only complicates the calculation of an appropriate fuel control signal, but it also reduces the sensitivity of such control signal. Further, where there is a double curvature of the speed line relative to the stall line, as illustrated by the 50% line in FIGURE 3, $P_3/P_2$ decreases as mass air flow also decreases. Thus, computation of the control signal as a function of $P_3/P_2$ and rotor speed becomes impractical if not impossible since it is not known whether a decrease in $P_3/P_2$ indicates that a stall condition is being approached or not.

This leads to a further explanation of conventional control systems. Since both pressure rise or ratio of the compressor and corrected air flow therethrough are inverse functions of $P_2$, an acceleration limit signal can be computed as a function of engine rotor speed, compressor inlet temperature ($T_2$) and $P_3$, this being done in most cases through the use of a 3D cam.

Computation of a control signal employing such parametric inputs have the shortcomings discussed above. In the broader aspects of the invention, Mach No. is employed as one of the basic parameters for controlling fuel flow in a gas turbine engine to maintain the ratio between $P_3/P_2$ and mass air flow below a point where stall would occur. Alternatively, the Mach No. parametric relationship may be employed to otherwise regulate $P_3$ to prevent stall.

Thus, it will be noted that the constant Mach No. lines shown in FIGURE 3 are substantially linear (straight) relative to $P_3/P_2$ and also that the speed lines do not have a double curvature relation to the Mach No. lines. These relationships indicate that a limit signal can be derived as a function of March No. $T_2$ and either $P_3$ or corrected rotor speed. In either event, a limit signal will be derived which prevents the ratio between $P_3/P_2$ to mass air flow from exceeding the stall line.

Use of $M_{N_3}$, $T_2$ and corrected speed as the parameters for computing a limit signal also enables greater accuracy in that $M_{N_3}$ will vary in the order of 3:2 in most compressors, whereas $P_3$ may vary over a range as much as 60 to 1 as speed and altitude vary. The lower variation in $M_{N_3}$ enables a higher resolution of the pressure measuring instrumentation, and hence greater accuracy.

As will be apparent from previous description, the fan 24 has essentially a fixed speed. That is to say, once the engine 10 is operating in an afterburner regime, the rotor speed of the core engine is maintained essentially a constant and thus the rotation of the fan is also essentially a constant. Considering the compressor map of FIGURE 3 as applicable to the fan 24, operation at a 100% actual speed, and with 100% corrected speed, the generator 50 would provide an output signal having a strength corresponding to an $M_{N_3}$ of .5. Since the actual fan speed is a known function of $T_2$ in the afterburning regime, there is no need for a speed input to the signal generator 50 although the actual and corrected speed of the fan will vary at different altitudes and flight speeds. The compressor inlet ($T_2$) is usually adequate to provide the correction factor. Thus, when flight conditions give a corrected speed of 90%, the $T_2$ input to the generator 50 will result in an output signal having a strength corresponding to the higher $M_{N_3}$ for 90% corrected speed at the acceleration limit line. In FIGURE 1, the Mach No. error signal for corrected speed is employed to control the area of the discharge nozzle 32 to maintain a desired $M_{N_3}$ so that the pressure rise across the fan, for a given air flow, is kept below the point at which stall will occur. This enables the primary regulation of fuel flow to the after burner nozzles 40 to be controlled as a function of pilot thrust demand signal, and as previously indicated, is of particular significance in transiently increasing the thrust output of the afterburner when large increases in $P_3$ can occur as a result of afterburner combustion. The fuel flow to the afterburner can be increased at a maximum rate as the nozzle area is varied to prevent stall in the fan.

FIGURE 2 illustrates a simple, fundamental gas turbine engine 200 comprising an axial flow compressor 202, a combustor 204, and a turbine 206. The operation of this engine is essentially the same as that of the core engine in the FIGURE 1 embodiment, in that a hot gas stream is generated as air is compressed by the compressor 202 to support combustion of fuel in the combustor 204, the hot gas stream drives the turbine 206, the rotor of which is connected to and drives the rotor of the compressor 202. The hot gas stream in the case of engine 200 is then discharged through a nozzle 208 to provide a propulsive force or other means may be employed to extract useful energy from the hot gas stream.

The thrust output of the engine 200 is primarily a function of the rate of fuel flow to the combustor 204. A conduit 210 connects a metering valve 212 to an appropriate source of fuel. The metering valve regulates the flow of fuel to a conduit 214 to nozzles 216 in the combustor 204. The valve 212 is mechanically connected to a torque motor 218 which positions the valve in accordance with the setting of a pilot controlled throttle lever 220 to provide a desired thrust output which may be related to engine speed i.e. the rate of rotation of the combustor and turbine rotors.

The throttle lever 220 is mechanically connected to a transducer 222 providing an electrical signal output, the magnitude of which indicates a desired engine speed. This signal is fed to a demand speed signal generator 223 which also has an input from a sensor 226 that provides a signal indicative of the temperature of air entering the compressor 202. The demand speed signal from generator 223 is summed with an actual speed signal at summation point 228. The actual speed signal is derived by a mechanical connection from the engine rotor to a transducer 230 which provides a signal output having a magnitude proportional to engine rotor speed. If actual speed and demand speed signals are not of the same magnitude, there is a resultant error signal from summation point 228 which, if it is within given limits, passes through selector circuits 232, 234, a switch 236 and a summation point 237 to an integrator 238. From integrator 238 the signal passes to an amplifier 242 and is then applied as a control signal to the motor 218 to displace the valve 212 until fuel flow to the combustor 220 is varied sufficiently to bring actual engine speed to that demanded by the setting of the throttle lever 220, whereupon there will no longer be a control signal applied to the motor M and the valve 212 will remain in a stable or relatively stable position.

For purposes of increasing stability and response, a fuel valve position signal generator 244 provides an input to a lag circuit 245. The output of this circuit provides a delayed negative rate feedback at summation point 237 so that the control signal to the motor 218 is decreased to minimize or prevent an "overshoot" in changing fuel flow.

The described use of a speed error signal to control the engine speed is conventional and in the present circuit would be employed to control the rate of change of fuel flow for relatively small changes in engine speed. However, to prevent compressor stall or combustor blowout, the following means are employed to maintain operation of the compressor 202 within the acceleration limit line and deceleration limit line explained in connection with FIGURE 3.

Again, the Mach No. ($M_{N_3}$) of the air discharged from the compressor 202 is sensed through the use of pressure probes 246, 248 which provide signal inputs to an actual $M_{N_3}$ signal generator 250 which may be constructed in the same fashion as the signal generator 42 of FIGURE 1 to provide an output signal proportionate to $M_{N_3}$. The actual $M_{N_3}$ signal is compared respectively at summation points 252, 254 with deceleration and acceleration limit $M_{N_3}$ signals. The deceleration limit $M_{N_3}$ signal is derived from a signal generator 256 having inputs from the speed signal transducer 230 and the $T_2$ sensor 226. The acceleration limit Mach No. signal is provided by a signal generator 258 also having these same inputs.

The signal generator 256 has an output proportional to the deceleration limit line as shown in FIGURE 3. The actual speed input is corrected by the $T_2$ input to establish the $M_{N_3}$ on the deceleration limit line for the conditions under which the engine is operating. Whenever the signals compared at summation 252 are unequal, there will be a resultant error signal.

For purposes of description, it will be assumed that a positive control signal, applied to motor 218 causes an increase in fuel flow and a negative control signal causes a decrease in fuel flow. When the pilot demands increased thrust, the speed error signal will be positive, and when decreased thrust is demanded, the speed error signal will be negative.

If the actual $M_{N_3}$ exceeds the deceleration limit $M_{N_3}$ value, i.e., has a higher value, the error signal will be positive at the signal selector 232. When this occurs or when the speed error singal is more negative than the deceleration speed error signal, the $M_{N_3}$ error signal is then passed from selector circuit 232 and applied as the control signal to motor 218 so that fuel flow is reduced at the minimum rate consistent with preventing a flame-out in the combustor 216.

Similarly, the acceleration limit Mach No. signal generator 258 will have an output strength reflecting the acceleration limit line for the compressor as shown in FIGURE 3. Again, the speed signal and $T_2$ signal inputs result in an output reflecting the limit $M_{N_3}$ value at corrected rotor speed for the operating conditions of the engine.

When the actual $M_{N_3}$ signal exceeds (actually becomes less in value) the acceleration limit signal, there will be a negative error signal from the summation point 254 which passes through a summation point 255 to the minimum signal selector 234. When this occurs or when the acceleration $M_{N_3}$ error signal is less positive than the speed error signal during acceleration, the $M_{N_3}$ error signal is applied as the control signal to motor 218. Displacement of fuel valve 212 is thus maintained so that $M_{N_3}$ follows whatever value is on the acceleration limit line and compressor stall is thus avoided.

Avoiding compressor stall is highly critical and for that reason, it is also preferable to add an anticipatory signal from an $M_{N_3}$ rate of change circuit 264. Where there is a rapid change in $M_{N_3}$, the output from the rate circuit 264 is applied to the summation point 255 as a negative feedback to the $M_{N_3}$ error signal, to thereby limit the rate of fuel increase to the combustor 204 to further prevent a transient combustor pressure rise which could result in a stall condition.

It should be pointed out that below approximately 50% engine speed, $M_{N_3}$ is not an effective parameter. In fact, its effectiveness is really significant above a speed of 50–80% dependent upon compressor design. It is for this reason that the $M_{N_3}$ lines in FIGURE 3 do not extend substantially below the 50% speed line.

Limiting of fuel flow during engine start up, usually to idle speed, is controlled by a signal generator 266 having inputs thereto from the actual speed transducer 230, the compressor inlet temperature sensor 226, and the compressor discharge pressure probe 246. This enables computation in a known manner, of a start fuel control signal. When the engine is started, the arm of switch 236 engages contact 236b as a solenoid 268 is energized. The start control signal can then pass through summation point 269 and switch 236 to be applied as the control signal to motor 218. An input from the fuel valve position signal generator 244, to summation point 269 closes the servo loop for controlling fuel flow during engine starts.

When idle speed is reached, the magnitude of the actual engine speed signal fed to a cutoff device 270 reaches a predetermined point which interrupts further flow of current to solenoid 268. When the solenoid 272 is de-energized, the arm of switch 236 shifts to contact 236a and rate of fuel flow and engine speed are controlled as a function of speed error within the limits established by the $M_{N_3}$ signal generators 256 and 258 as previously described.

FIGURES 1 and 2 respectively illustrate the use of the $M_{N_3}$ parameter to vary or limit fuel flow or the ultimate compressor discharge area to regulate the pressure rise across a compressor so as to prevent stall from occurring and also illustrating how $M_{N_3}$ may be controlled to prevent flowout or flameout of a combustion process in the air stream discharged from the compressor. Other embodiments of the broader aspects of the invention will occur to those skilled in the art as they are applicable to different forms of gas turbine engines or to more refined control systems. Thus, for example, the $M_{N_3}$ parameter could be used to control variable inlet guide vanes to the turbine 206 of FIGURE 2 which, in essence, would be quite similar to the principles involved in the control system of FIGURE 1 in that the effective discharge area of the compressor is being varied. Further, any desired stage of a multiple stage or spool compressor or a plurality of stages thereof could be considered as a compressor, per se, to derive a limiting or control signal as a function of the Mach No. of the air discharged therefrom.

Additionally it is to be understood that $M_{N_3}$ need not be measured directly at the compressor discharge but could be sensed at some other point so long as the sensed value had a predictable, predetermined relation to the actual value.

Having thus described the invention, what is claimed as novel and desired to be secured by Letters Patent of the United States is:

1. In a turbofan gas turbine engine comprising a gas turbine core engine, a low pressure compressor fan driven thereby, a variable area nozzle through which at least a portion of air compressed by said fan is discharged, an afterburner for burning fuel in the fan air stream prior to its discharge through said nozzle, the pressure rise across said fan having a critical limit which, if exceeded, will cause a stall condition; a control system which comprises, (A) pilot actuated means for controlling fuel flow to said afterburner comprising,
    a throttle lever movable to a position demanding afterburner operation,
    means responsive to such movement for generating a thrust demand signal,
    means for deriving from said thrust demand signal a control signal,
    means for metering fuel flow to said afterburner as a function of said control signal, and
    means for initiating afterburner combustion when the speed of the core engine is essentially a constant;

(B) means responsive to the Mach No. ($M_{N_3}$) of air discharged from said fan for controlling the area of said nozzle at a point maintaining $M_{N_3}$ a predetermined constant within said critical limit where stall would occur, thereby preventing stall as a result of changes in the rate of combustion of afterburner fuel, said nozzle area control means comprising,
    a torque motor responsive to a control signal,
    means for generating an area control signal as a function of the position of said throttle lever and means for applying said throttle position generated control signal to said torque motor when the throttle lever is not in a position demanding afterburner operation,
    means for generating an $M_{N_3}$ responsive area control signal and means for switching said $M_{N_3}$ responsive control signal to said torque motor when said throttle lever is in an afterburner demand position,
    said $M_{N_3}$ responsive control signal generating means comprising,
    means for generating a demand $M_{N_3}$ signal as a function of the temperature of the air entering the fan and the constant speed of the fan,
    means for generating an actual $M_{N_3}$ signal,
    means for summing the actual and demand $M_{N_3}$ signals to derive an $M_{N_3}$ error signal,
    means for generating a signal indicative of the rate of variation of said nozzle area,
    means for generating a signal indicative of the rate of change in said fuel flow,
    said rate signals having opposite polarities, the rate signal for fuel increase having the same polarity as an $M_{N_3}$ error signal calling for an increase in nozzle area,
    means for summing said rate signals with the $M_{N_3}$ error signal to obtain the $M_{N_3}$ responsive area control signal so that in the control of nozzle area there is a negative feedback as a function of its rate of change and a positive feedback as a function of the rate of increase of fuel flow, and
    means responsive to said torque motor for varying the area of said nozzle;

(C) fuel flow limit means comprising
    means for generating a maximum $M_{N_3}$ error reference signal,
    means for summing said maximum $M_{N_3}$ error reference signal and the actual $M_{N_3}$ error signal,
    means for passing a limiting signal when said actual $M_{N_3}$ error signal exceeds said reference $M_{N_3}$ error signal, and means responsive to said limiting signal for reducing the rate of fuel flow to said afterburner,
    said fuel flow limit means further comprising,
    means for generating a signal indicative of the actual area of the nozzle,
    means for generating a minimum nozzle area reference signal,
    means for summing said nozzle area signals,
    a diode for passing an error signal resulting from said last named summation when it has a polarity indicating that the actual nozzle area is below a given value, and
    means operative a predetermined period after the signal has been passed by said diode for maintaining fuel flow to said afterburner at a minimum value.

References Cited

UNITED STATES PATENTS

| | | | |
|---|---|---|---|
| 2,693,081 | 11/1954 | Russ | 60—39.28 |
| 3,342,031 | 9/1967 | Bevers | 60—39.28 |
| 2,641,105 | 6/1953 | Drake | 60—238 |
| 2,761,280 | 9/1956 | Atkinson | 60—243 |
| 2,933,887 | 4/1960 | Davies | 60—236 |
| 3,041,826 | 7/1962 | Coar | 60—243 XR |
| 3,293,847 | 12/1966 | Rogers et al. | 60—243 XR |
| 3,316,713 | 5/1967 | Urban | 60—243 XR |

AL LAWRENCE SMITH, Primary Examiner

U.S. Cl. X.R.

60—39.28, 262